Patented Feb. 19, 1929.

1,702,259

UNITED STATES PATENT OFFICE.

CHARLES B. HILL, OF GLENCOE, AND MAURICE H. GIVENS, OF EVANSTON, ILLINOIS, ASSIGNORS TO NORTHWESTERN YEAST COMPANY, OF CHICAGO, ILLINOIS, A CORPORATION OF ILLINOIS.

YEAST-SAVING COMPOSITION IN BREAD MAKING.

No Drawing.    Application filed January 10, 1927.   Serial No. 160,299.

This invention relates to the manufacture of partially or wholly yeast leavened bread and the like. More particularly, it relates to a composition of matter serving as a yeast food either in solution with the yeast or in a dough, and in the latter case assisting in the maturing of the dough.

In making doughs, the use of the yeast-saving composition of this invention results at the will of the operator in either a saving of yeast or a reduction in the usual time period for maturing the dough, this regardless of whether a conventional sponge or straight dough bread-making formula is used.

Further advantages of this invention are: (a) a better and more concentrated yeast food than is now available; (b) a yeast food free of potentially toxic substances as compounds of iodine and bromine; (c) a yeast food devoid of filler and therefore more easily and economically handled; and (d) a yeast food more nearly like the inorganic substances upon which the usual baker's yeast feeds.

There are now many yeast saving compositions for use in bread-making containing bromine and iodine compounds which are credited with the yeast saving but such mixtures must be handled with care for if too much is added to the dough, the yeast is injured and attempts are made to avoid this by using a large amount of filler which results in unnecessary bulk and consequent greater handling expense. It is alleged that the components of these prior art mixtures stimulate the yeast but in fact the real action of the halogens is to stimulate the action of the enzymes secreted by the least. The present invention avoids the use of the objectionable compounds and secures a better result. This result is obtained by using a mixture on which yeast both with and without the other dough constituents multiplies so greatly that it thereby makes available a sufficient concentration of enzymes to accomplish the desired result.

Again, there are well known yeast-saving compositions calling for the use of an ammonium salt or a calcium salt or a combination of an ammonium salt and a calcium salt, but in none of these is it revealed or shown that an ammonium salt can be combined to produce satisfactory results with more than one calcium salt. Furthermore, these prior disclosures particularly refer to the use of ammonium chloride and state that insoluble calcium salts are not satisfactory. On the contrary, this invention discloses the possibilities and economy of using a recognized insoluble calcium salt, a different ammonium compound, and a combination of two calcium salts with an ammonium compound. The economies of this invention are effected by omitting costly halogen compounds and by using the cheapest available ammonium compound as well as cheap calcium salts.

The course of reactions occuring with compositions of matter of this invention in the presence of yeast and the other dough ingredients may be explained as follows: The yeast cells start to multiply and feed on the basic radicals of the ammonium sulphate and the calcium sulphate, thereby setting free the acid radicals which gradually put into solution the water insoluble calcium phosphate and make it available for the yeast to use as food. This gradual liberation of acid radicals also assists in the maturing of the gluten in an ideal manner.

The composition of matter constituting the subject of this invention consists of ammonium sulphate, calcium sulphate, and calcium phosphate, $Ca_3(PO_4)_2$.

The components referred to are compounded approximately in the following proportions, to wit: ammonium sulphate, 2 parts; calcium sulphate, 1 part; and calcium phosphate, $Ca_3(PO_4)_2$, 1 part.

These materials are intimately and completely mixed in powder form by grinding them together with any of the known conventional mixing machines.

This composition is most satisfactory in an amount equivalent to 0.2% of the total flour which entered into the dough. However, inasmuch as it contains substances neither toxic to man nor yeasts, this proportion may be varied within reasonable limits readily ascertained by a little experimental baking. In addition to using it directly in the dough batch by incorporating it, preferably in the flour, it may be used in a solution with yeast to stimulate and increase the amount of yeast prior to making the dough.

It is preferable to make the mixture of the inorganic salts alone as described, but there is nothing in principle to prevent the use of a filler as flour, starch, sugars, powdered milk, or the like, if desired, and of course using accordingly a larger proportionate part of the filled material.

An illustration of satisfactory use of the invention is seen in the Hill and Tintner process for making bread set forth in U. S. Patent No. 1,643,011, issued September 20, 1927.

Having thus described our invention, what we claim as new and desire to secure by Letters Patent is:

1. A new composition of matter for use, associated with yeast, in the making of leavened bread and the like, consisting of ammonium sulphate, calcium sulphate and tricalcium phosphate, $Ca_3(PO_4)_2$; substantially as described.

2. A new composition of matter, for use, associated with yeast, in the making of leavened bread and the like, consisting of approximately two parts ammonium sulphate, one part tricalcium sulphate and one part calcium phosphate, $Ca_3(PO_4)_2$; substantially as described.

In witness whereof, we have hereunto subscribed our names.

CHARLES B. HILL.
MAURICE H. GIVENS.

CERTIFICATE OF CORRECTION.

Patent No. 1,702,259.

Granted February 19, 1929, to

CHARLES B. HILL ET AL.

It is hereby certified that error appears in the printed specification of the above numbered patent requiring correction as follows: Page 1, line 39, for the word "least" read "yeast"; page 2, line 23, claim 2, for "tricalcium sulphate" read "calcium phosphate", and lines 23 and 24, for calcium phosphate" read "tricalcium phosphate"; and that the said Letters Patent should be read with these corrections therein that the same may conform to the record of the case in the Patent Office.

Signed and sealed this 23rd day of April, A. D. 1929.

(Seal)

M. J. Moore,
Acting Commissioner of Patents.

CERTIFICATE OF CORRECTION.

Patent No. 1,702,259.

Granted February 19, 1929, to

It is hereby certified that the Certificate of Correction issued April 23, 1929, was erroneously drawn as to the words "calcium phosphate", first occurrence, in line 4, and that this Certificate should have read as follows: Page 2, line 23, claim 2, for "tricalcium sulphate" read "calcium sulphate", that the said Certificate may conform to the records of the office.

Signed and sealed this 21st day of May, A. D. 1929.

(Seal)

M. J. Moore,
Acting Commissioner of Patents.

a filler as flour, starch, sugars, powdered milk, or the like, if desired, and of course using accordingly a larger proportionate part of the filled material.

An illustration of satisfactory use of the invention is seen in the Hill and Tintner process for making bread set forth in U. S. Patent No. 1,643,011, issued September 20, 1927.

Having thus described our invention, what we claim as new and desire to secure by Letters Patent is:

1. A new composition of matter for use, associated with yeast, in the making of leavened bread and the like, consisting of ammonium sulphate, calcium sulphate and tricalcium phosphate, $Ca_3(PO_4)_2$; substantially as described.

2. A new composition of matter, for use, associated with yeast, in the making of leavened bread and the like, consisting of approximately two parts ammonium sulphate, one part tricalcium sulphate and one part calcium phosphate, $Ca_3(PO_4)_2$; substantially as described.

In witness whereof, we have hereunto subscribed our names.

CHARLES B. HILL.
MAURICE H. GIVENS.

CERTIFICATE OF CORRECTION.

Patent No. 1,702,259.  Granted February 19, 1929, to

CHARLES B. HILL ET AL.

It is hereby certified that error appears in the printed specification of the above numbered patent requiring correction as follows: Page 1, line 39, for the word "least" read "yeast"; page 2, line 23, claim 2, for "tricalcium sulphate" read "calcium phosphate", and lines 23 and 24, for calcium phosphate" read "tricalcium phosphate"; and that the said Letters Patent should be read with these corrections therein that the same may conform to the record of the case in the Patent Office.

Signed and sealed this 23rd day of April, A. D. 1929.

(Seal)   M. J. Moore,
Acting Commissioner of Patents.

CERTIFICATE OF CORRECTION.

Patent No. 1,702,259.  Granted February 19, 1929, to

It is hereby certified that the Certificate of Correction issued April 23, 1929, was erroneously drawn as to the words "calcium phosphate", first occurrence, in line 4, and that this Certificate should have read as follows: Page 2, line 23, claim 2, for "tricalcium sulphate" read "calcium sulphate", that the said Certificate may conform to the records of the office.

Signed and sealed this 21st day of May, A. D. 1929.

(Seal)   M. J. Moore,
Acting Commissioner of Patents.

CERTIFICATE OF CORRECTION.

Patent No. 1,702,259.  Granted February 19, 1929, to

It is hereby certified that the Certificate of Correction issued April 23, 1929, was erroneously drawn as to the words "calcium phosphate", first occurrence, in line 4, and that this Certificate should have read as follows: Page 2, line 23, claim 2, for "tricalcium sulphate" read "calcium sulphate", that the said Certificate may conform to the records of the office.

Signed and sealed this 21st day of May, A. D. 1929.

(Seal)

M. J. Moore,
Acting Commissioner of Patents.